United States Patent
Venkataraghavan et al.

(10) Patent No.: US 11,716,249 B2
(45) Date of Patent: Aug. 1, 2023

(54) SYSTEM, METHOD, AND COMPUTER PROGRAM FOR INTELLIGENT MUTING MITIGATION

(71) Applicant: RAKUTEN MOBILE, INC., Tokyo (JP)

(72) Inventors: Krishnan Venkataraghavan, Tokyo (JP); Vaibhav Pradhan, Tokyo (JP); Sandeep Mani Tripathi, Tokyo (JP)

(73) Assignee: RAKUTEN MOBILE INC., Tokyo (JP)

( * ) Notice: Subject to any disclaimer, the term of this patent is extended or adjusted under 35 U.S.C. 154(b) by 0 days.

(21) Appl. No.: 17/524,828

(22) Filed: Nov. 12, 2021

(65) Prior Publication Data
US 2023/0155887 A1 May 18, 2023

(51) Int. Cl.
*H04L 41/0816* (2022.01)
*H04L 65/1016* (2022.01)
*H04L 47/20* (2022.01)
*H04L 47/32* (2022.01)
*H04L 65/1069* (2022.01)

(52) U.S. Cl.
CPC .......... *H04L 41/0816* (2013.01); *H04L 47/20* (2013.01); *H04L 47/32* (2013.01); *H04L 65/1016* (2013.01); *H04L 65/1069* (2013.01)

(58) Field of Classification Search
CPC ...... H04L 41/0816; H04L 47/20; H04L 47/32
USPC ....................................................... 709/221
See application file for complete search history.

(56) References Cited

U.S. PATENT DOCUMENTS

| 11,172,411 | B2 | 11/2021 | Frankkila et al. | |
| 2005/0088968 | A1* | 4/2005 | Lauer | H04W 28/22 370/229 |
| 2009/0238207 | A1* | 9/2009 | Zhao | H04W 28/22 455/452.2 |
| 2012/0182868 | A1* | 7/2012 | Lovsen | H04M 15/64 370/230 |
| 2012/0263120 | A1* | 10/2012 | Gopalakrishnan | H04W 72/54 370/329 |
| 2014/0072032 | A1* | 3/2014 | Melnyk | H04L 47/32 375/240.02 |

(Continued)

FOREIGN PATENT DOCUMENTS

WO WO-2017172449 A1 * 10/2017

OTHER PUBLICATIONS

Martin, VoLTE—Some Thoughts on Bandwidth Negotiation, Mar. 22, 2016, blog.wirelessmoves.com, https://blog.wirelessmoves.com/2016/03/volte-some-thoughts-on-bandwidth-negotiation.html (Year: 2016).*

(Continued)

*Primary Examiner* — Zi Ye
(74) *Attorney, Agent, or Firm* — Sughrue Mion, PLLC

(57) ABSTRACT

A method for dynamically adapting a maximum bitrate (MBR) configuration of an IP Multimedia Subsystem (IMS)/Rich Communication Services (RCS) application, includes receiving a signal from a client server for an IMS/RCS application, establishing a bearer channel for an Internet multimedia communication, the channel having an initial preconfigured MBR, determining a codec used to transmit the communication, determining the bitrate used by a codec, and modifying the MBR of the channel based on the bitrate of the codec.

11 Claims, 19 Drawing Sheets

(56) References Cited

U.S. PATENT DOCUMENTS

2019/0028992 A1\* 1/2019 Kim .................... H04W 88/16

OTHER PUBLICATIONS

International Search Report dated Jun. 14, 2022 in International Application No. PCT/US2022/016070.
Written Opinion of the International Searching Authority dated Jun. 14, 2022 in International Application No. PCT/US2022/016070.

\* cited by examiner

100

101 Origination/Termination Call Trigger

102 Dedicated Bearer Establishment

103 Bit Rate Validation

104 MBR Correction

105 Bearer Modification

FIG. 1

| Codec & Transport | Type | Codec Bitrate (kbps) | IP+UDP+RTP+SRTP Overhead (kbps) | 5% for SRCP (kbps) | Stun Pings (kbps) | Total bitrate (kbps) |
|---|---|---|---|---|---|---|
| AMR-WB (mode=2) with IPv4 | Fixed bit rate | 12.65 | 20 | 1.9925 | 18.7 | 53.3425 |
| AMR-WB (mode=2) with IPv6 | Fixed bit rate | 12.65 | 28 | 2.3925 | 26.4 | 69.4425 |

FIG. 4

| BM | TimeStamp | DM | UE | eNB(BTS) | MME(N/W) | Interface | Message | Pigg. |
|---|---|---|---|---|---|---|---|---|
| | 2020-03-30 14:06:17.445 | | → | | | LTE RRC | measurementReport | |
| | 2020-03-30 14:06:21.831 | | ← | | | LTE RRC | rrcConnectionReconfiguration | Security protect |
| | 2020-03-30 14:06:21.832 | | → | | | LTE RRC | rrcConnectionReconfigurationComplete | |
| | 2020-03-30 14:06:21.840 | | | ⋯ | | 3GPP NAS | Security protected NAS message | |
| | 2020-03-30 14:06:21.840 | | | | ↑ | 3GPP NAS | Modify EPS bearer context accept | |
| | 2020-03-30 14:06:21.846 | | | | ↑ | 3GPP NAS | Modify EPS bearer context accept | |
| | 2020-03-30 14:06:21.847 | | | | | 3GPP NAS | Security protected NAS message | |
| | 2020-03-30 14:06:21.848 | | → | | | LTE RRC | ulInformationTransfer | Security protect |
| | 2020-03-30 14:06:21.562 | | → | | | LTE RRC | measurementReport | |
| | 2020-03-30 14:06:21.671 | | | | | LTE RRC | measurementReport | |

FIG. 5A

```
EPSBearerIdentity: 7
ProcedureTransactionIdentity: 0
NewEPSQoS:
    QCI: 1
    basic:
        MaximumBitRateForUplink: 30 kbps
        MaximumBitRateForDownlink: 30 kbps
        GuaranteedBitRateForUplink: 30 kbps
        GuaranteedBitRateForDownlink: 30 kbps
APNAMBR:
    APN_AMBRDownlink: 8640 kbps
    APN_AMBRUplink: 8640 kbps
    ext:
        APN_AMBRDownlink: 200 kbps
        APN_AMBRUplink: 200 Mbps
    ext2:
        APN_AMBRDownlink: 4096 Mbps
```

MBR capped at 30kbps by a Modify bearer request for QCI 1

FIG. 5B

```
Dynamic Charging Rule Definition(s)
Name                         Prior     Content-Id
-------------------          -----     ----------

MT:AUDIO    MCN:1  FN:0    Rule#:2     129
```

*Charging rule from PCRF limits the bit rate to 30kbps (reason for modify bearer request)*

```
Configured:

Chrg-Type    Rule Parameters
-----------------------------------------------

1000 Offline Gate Status:       Allow All
        QoS Class Identifier:    1
        ARP Priority Level:      3
        Reporting Level:Rating Grp
        Metering Method:   Duration
        Uplink MBR:             30000
        Downlink MBR:           30000
        Uplink GBR:             30000
        Downlink GBR:           30000
        Uplink PDR id:         0x000B
        Uplink FAR id:         0x000B
        Uplink QER id:     0x00000005
        Dnlink PDR id:         0x000C
        Dnlink FAR id:         0x000C
        Dnlink QER id:     0x00000005
        URR id:            0x00000022
        URR id:            0x00000031
        Filter 1:
```

From Fig. 6A

```
Input pkts dropped: 26
CF Buffered Uplink Packets: 0
CF Buffered Uplink Bytes: 0
Uplink Packets in Buffer: 0
Buff Over - limit Uplink pkts: 0
DDN buffered pkts: 0
DDN buffered overflow drop pkts: 0
pk rate from user (bps): 9940
ave rate from user (bps): 6269
sust rate from u
pk rate from use         ??user-35kbps
ave rate from us
sust rate from u
ipv4 bad hdr:0
ipv4 fragments s
ipv4 bad length:
Input pkts dropped (0 mbr: 0
ipv4 input acl drop: 0
ipv6 input acl drop: 0
ip source violations: 0
ipv6 bad hdt: 0
ipv4 icmp packets dropped: 0
APN AMBR UPlink Pkts Drop: 0
APN AMBR UPlink Bytes Drop: 0
APN AMBR UPlink Pkts IP pref lowered: 0
APN AMBR UPlink Bytes IP pref lowered: 0
ITC Uplink Pkts Drop: 19
ITC Uplink Bytes Drop: 1577
ITC Uplink Pkts IP pref lowered: 0
ITC Uplink Bytes IP pref lowered: 0
ITC Terminated Flows: 0
Flow Action Terminated Flow     Packets getting
ToS marked Uplink Pkts: 0       dropped at PGW
ToS marked Uplink bytes: 0
OC Dropped Uplink Pkts: 0
OC Dropped Uplink Pytes: 0
Uplink inflight Pkts: 24
UK: 440110010003702 ######
  Subscriber Parameters:
```

From Fig. 6B

```
output pkts dropped: 1074
CF Buffered Downlink Packets: 0
CF Buffered Downlink Bytes: 0
Downlink Packets in Buffer: 0
Buff Over - limit Downlink Pkts: 0
DDN buffered bytes: 0
DDN buffer overflow drop bytes: 0
pk rate to user(bps): 35041
ave rate to user(ps): 34651
sust rate to user (bps): 34651
pk rate to user(pps): 51
ave rate to user(pps): 51
sust rate to user(pps): 51
ipv4 ttl exceeded : 0
ipv4 could not fragment: 0
output pkts dropped (0 mbr):          □○□0%
ipv4 output acl drop: 0
ipv6 output acl drop: 0
ipv4 output no-flow drop: 0
ipv6 bad length trim: 0
APN AXBR Downlink Pkts Drop: 0
APN AXBR Downlink Bytes Drop: 0
APN AXBR Downlink Pkts IP pref lowered: 0
APN AXBR Downlink Bytes IP pref lowered: 0
ITC Downlink Bytes Drop: 1071
ITC Downlink Bytes Drop: 92981
ITC Downlink Pkts IP pref lowered: 0
ITC Downlink Bytes IP pref lowered: 0
ITC Redirected Flow: 0
Flow Action Redirected Flows: 0
ToS marked Downlink Pkts: 5791
ToS marked Downlink Bytes: 325423069
CC Dropped Downlink Pkts: 0
CC Dropped Downlink Bytes: 0
Downlink Inflight Pkts: 56
```

From Fig. 6C

FIG. 6D

```
Dynamic Charging Rule Definition(s) Configured:
Name          Prior Content  - Id Chrg-Type Rule Parameters
MT: AUDIO MCN: 1 FN:0 Rule#: 3 128 1000  Offline Gate Status: Allow
                                         QoS Class Identifier: 1
                                         ARP Priority Level:   3
                                         Reporting LevelRating Grp
                                         Metering Method:Duration
                                         Uplink MBR:      82000
                                         Downlink MBR:    82000
                                         Uplink GBR:      82000
                                         Downlink GBR:    82000
                                         Uplink PDR id:   0x000F
                                         Uplink FAR id:   0x000F
                                         Uplink QER id:0x00000008
                                         Dnlink PDR id:   0x0010
                                         Dnlink FAR id:   0x0010
                                         Dnlink QER id:0x00000008
                                         URR id:       0x00000042
                                         URR id:       0x00000051
                                         Filter 1:
                                         Direction:      Uplink
                                         Protocol:          VDP
                                         Src Addr 10.12.8.37/32
                                         Dst Addr 133.106.12.24/32
                                         Src Port:        43019
                                         Dst Port:        17144
                                         Filter 2:
                                         Direction:     Downlink
                                         Protocol:          VDP
                                         Src Addr 133.106.12.24/32
                                         Dst Addr 10.12.8.37/32
                                         Src Port:        17144
                                         Dst Port:        43019
```

To Fig. 7B

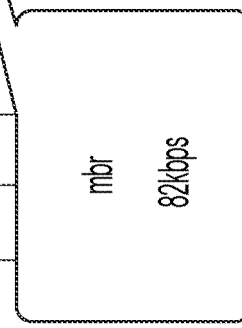

mbr 82kbps

FIG. 7A

```
APN AMBR Downlink Pkts Drop: 0
APN AMBR Downlink Bytes Drop: 0
APN AMBR Downlink Pkts IP pref lowered: 0
APN AMBR Downlink Bytes IP pref lowered: 0
ITC Downlink Pkts Drop: 0
ITC Downlink Bytes Drop: 0
ITC Downlink Pkts Ip pref lowered: 0
ITC Downlink Bytes Ip pref lowered: 0
ITC Redirected Flows: 0
Flow Action Redirected Flows: 0
Tos marked Downlink Pkts: 0
Tos marked Downlink Bytes: 0
CC Dropped Downlink Pkts: 0
CC Dropped Downlink Bytes: 0
Downlink Inflight Pkts: 558
```

FIG. 7C

- Subscription-ld AVP = END_USER_SIP_URI (due to the possibility of Gx binding failure in case of MSISDN and device mismatch, e.g. multi-ID)
- AF-Application-Identifier AVP = <Configurable> (e.g. Voice, Video, etc)
- Required-Access-Info AVP = User Location, MS Time Zone
- Specific-Action AVP = "INDICATION OF LOSS OF BEARER", "INDICATION OF RELEASE OF BEARER", "IP-CAN CHANGE", "INDICATION_OF_FAILED_RESOURCES_ALLOCATION", "ACCESS_NETWORK_INFO_REPORT", "CHARGING.CORRELATION_EXCHANGE".
- Media-Type = AUDIO(1), VIDEO(2)
- Max-Requested-Bandwidth-UL/DL for AUDIO = 30,000
- Max- Requested-Bandwidth-UL/DLfor VIDEO = 30,000
- Media Component Description, Service-Info-Status, Framed-IP-Address, Framed-IPV6-Prefix, etc.
- AF-Requested-Data AVP with "EPC-level identities required"

FIG. 10

- Subscription-Id AVP = END_USER_SIP_URI (due to the possibility of Gx binding failure in case of MSISDN and device mismatch, e.g. multi-ID)
- AF-Application-Identifier AVP = <Configurable> (e.g. Voice, Video, etc)
- Required-Access-Info AVP = User Location, MS Time Zone
- Specific-Action AVP = "INDICATION OF LOSS OF BEARER", "INDICATION OF RELEASE OF BEARER", "IP-CAN CHANGE", "INDICATION OF FAILED RESOURCES ALLOCATION", "ACCESS_NETWORK_INFO_REPORT", "CHARGING.CORRELATION_EXCHANGE".
- Media-Type = AUDIO(1), VIDEO(2)
- Max-Requested-Bandwidth-UL/DL for AUDIO = 88,000
- Max- Requested-Bandwidth-UL/DLfor VIDEO = 1,500,000
- Media Component Description, Service-Info-Status, Framed-IP-Address, Framed-IPV6-Prefix, etc.
- AF-Requested-Data AVP with "EPC-level identities required"

FIG. 11

SYSTEM, METHOD, AND COMPUTER PROGRAM FOR INTELLIGENT MUTING MITIGATION

BACKGROUND

Presently, for Internet-connected telecommunications, a maximum bitrate (MBR) for communication (e.g., through a dedicated bearer establishment) is preconfigured by an application server based on service type (e.g., voice and/or data). Additionally bitrate changes (e.g., for higher codec modes) require reconfiguration of the initially set MBR at the packet gateway.

However, according to this current configuration, the Internet-connected telecommunication can exceed the preconfigured MBR. This can happen by way of stun ping throughput spikes, for example by codec rate or mode changes at the application level. When the Internet-connected telecommunication exceeds the preconfigured MBR, degraded user experiences, packet loss and muting may result.

SUMMARY

According to an embodiment, a method of dynamically adapting a maximum bitrate (MBR) configuration of an IP Multimedia Subsystem (IMS)/Rich Communication Services (RCS) application, may include receiving a signal from a client server having initiated or terminated an Internet multimedia communication through the IMS/RCS application, establishing at least one bearer channel for the Internet multimedia communication, the at least one bearer channel having an initial preconfigured MBR, determining a codec used to transmit the Internet multimedia communication through the IMS/RCS application, determining the bitrate used by the codec, modifying the MBR of the at least one bearer channel based on the bitrate of the codec.

The initial preconfigured MBR of the at least one bearer channel may be set by a policy control and charging function (PCRF), which in turn may be set by the IMS/RCS application.

The method may further include, after the at least one bearer channel is established, configuring the at least one bearer channel to transmit at the initial preconfigured MBR.

The method may further include adjusting the MBR, and following the adjustment, determining and verifying whether packets losses are occurring with the adjusted MBR.

The method may further include determining whether the bitrate for the Internet multimedia communication is compliant with the MBR of the at least one bearer channel.

The method may further include modifying the MBR of the at least one bearer channel upon a determination that the bitrate for the Internet multimedia communication is not compliant with the MBR of the at least one bearer channel.

The method may further include determining packet drop, e.g. at a packet gateway (PGW) for both uplink and downlink tunnels of bearer channels.

According to another embodiment, a platform for dynamically adapting a maximum bitrate (MBR) configuration of a computer-implemented IP multimedia subsystem (IMS)/ Rich Communication Services (RCS) application may include a memory configured to store instructions; and one or more processors configured to execute the instructions to: receive a signal from a client server having initiated or terminated an Internet multimedia communication through the IMS/RCS application, establish at least one bearer channel for the Internet multimedia communication, the at least one bearer channel having an initial preconfigured MBR, determine a codec used to transmit the Internet multimedia communication through the IMS application, determine the bitrate used by the codec, and modify the MBR of the at least one bearer channel based on the bitrate of the codec.

In the platform, the initial preconfigured MBR of the at least one bearer channel may be set by a policy control and charging function (PCRF), which in turn is set by the IMS/RCS application.

The one or more processors of the platform may be further configured to execute the instructions to configure the at least one bearer channel to transmit at the initial preconfigured MBR.

The one or more processors of the platform may be further configured to adjust the MBR, and following the adjustment, determine and verify whether packets losses are occurring with the adjusted MBR.

The one or more processors of the platform may be further configured to determine whether the bitrate for the Internet multimedia communication is compliant with the MBR of the at least one bearer channel.

The one or more processors of the platform may be further configured to modify the MBR of the at least one bearer channel upon a determination that the bitrate for the Internet multimedia communication is not compliant with the MBR of the at least one bearer channel.

The one or more processors of the platform may be further configured to determine packet drop at a packet gateway (PGW) for both uplink and downlink tunnels of bearer channels.

According to another embodiment, a non-transitory computer-readable medium storing instructions may be provided, the instructions including: one or more instructions that, when executed by one or more processors of a deployment platform for managing at least one network element, cause the one or more processors to: receive a signal from a client server having initiated or terminated an Internet multimedia communication through an IP Multimedia Subsystem (IMS)/Rich Communication Services (RCS) application, establish at least one bearer channel for the Internet multimedia communication, the at least one bearer channel having an initial preconfigured MBR, determine a codec used to transmit the Internet multimedia communication through the IMS/RCS application, determine the bitrate used by the codec, and modify the MBR of the at least one bearer channel based on the bitrate of the codec.

The initial preconfigured MBR of the at least one bearer channel may be set by a policy control and charging function (PCRF), which in turn may be set by the IMS?RCS application.

The one or more instructions may further cause the one or more processors to configure the at least one bearer channel to transmit at the initial preconfigured MBR.

The one or more instructions may further cause the one or more processors to adjust the MBR, and following the adjustment, determine and verify whether packets losses are occurring with the adjusted MBR.

The one or more instructions may further cause the one or more processors to determine whether the bitrate for the Internet multimedia communication is compliant with the MBR of the at least one bearer channel.

The one or more instructions may further cause the one or more processors to determine packet drop at a packet gateway (PGW) for both uplink and downlink tunnels of bearer channels.

BRIEF DESCRIPTION OF THE DRAWINGS

FIG. 1 is a flow chart of an example process according to an embodiment.

FIG. 4 depicts a calculation process of a bitrate for an RCS session according to an embodiment.

FIG. 5A depicts capping of maximum bitrates of upload and download for an Internet Protocol Connectivity Access Network (IP-CAN) session according to an embodiment.

FIG. 5B depicts capping of maximum bitrates of upload and download for an Internet Protocol Connectivity Access Network (IP-CAN) session according to an embodiment.

FIG. 6A depicts packet gateway throughput where a maximum bitrate set by a policy and charging rules function is less than a total bitrate from a transmitting application.

FIG. 6B depicts packet gateway throughput where a maximum bitrate set by a policy and charging rules function is less than a total bitrate from a transmitting application.

FIG. 6C depicts packet gateway throughput where a maximum bitrate set by a policy and charging rules function is less than a total bitrate from a transmitting application.

FIG. 6D depicts packet gateway throughput where a maximum bitrate set by a policy and charging rules function is less than a total bitrate from a transmitting application.

FIG. 7A depicts packet gateway throughput where a maximum bitrate is updated or set to be greater than a total bitrate calculated for a transmitting application, according to an embodiment.

FIG. 7C depicts packet gateway throughput where a maximum bitrate is updated or set to be greater than a total bitrate calculated for a transmitting application, according to an embodiment.

FIG. 10 depicts a message content of an authorization/authentication request (AAR) and/or an authorization/authentication answer (AAA) for a configuration of a maximum bitrate prior to updating according to an embodiment.

FIG. 11 depicts a message content of an AAR and/or AAA for a configuration of a maximum bitrate updated according to an embodiment.

DETAILED DESCRIPTION

Figure 2:
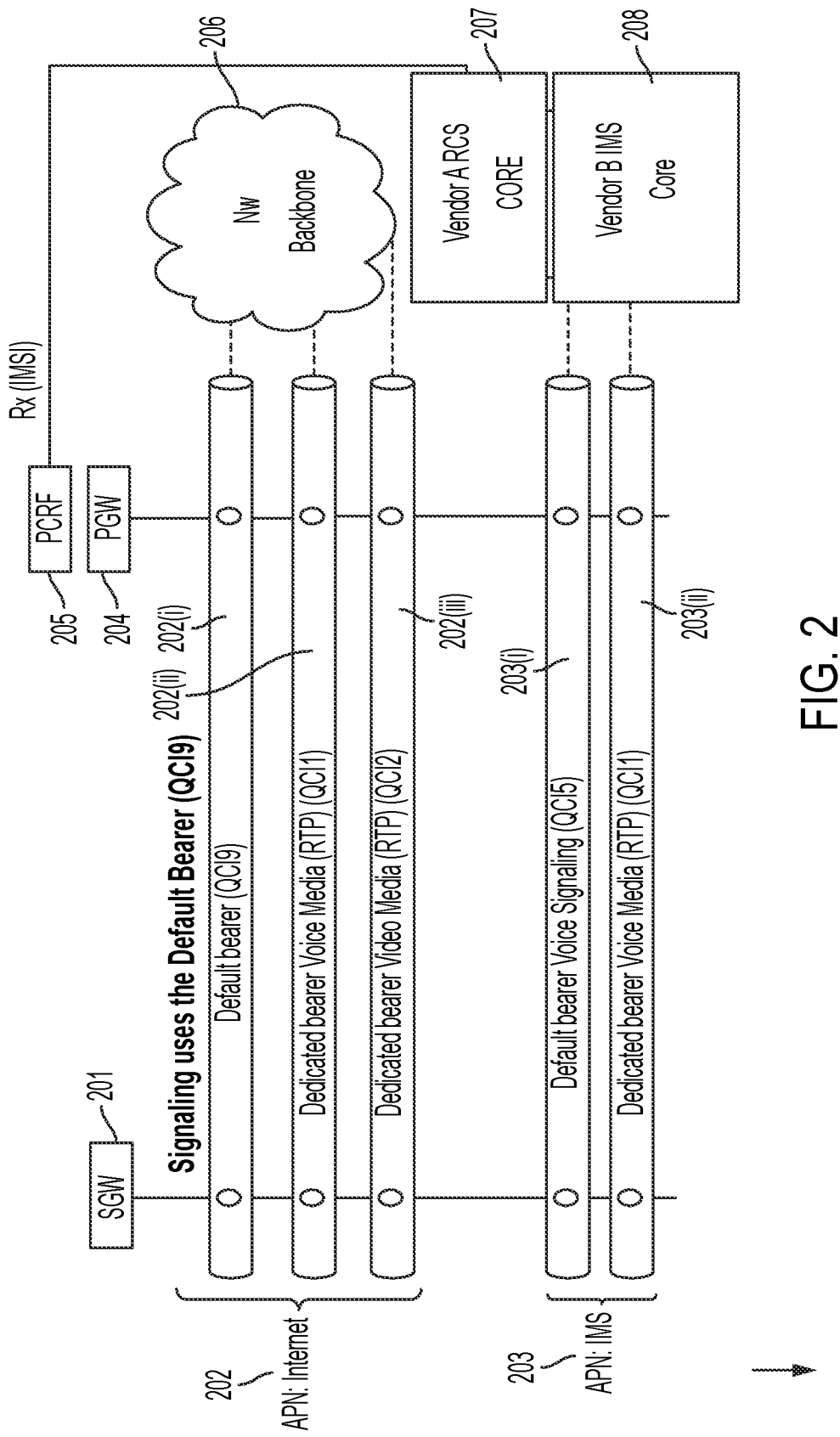
FIG. 2 is a diagram illustrating the establishment/creation of a dedicated bearer for Internet telecommunications according an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

As described above, in the current state of the art, a maximum bitrate (MBR) for Internet telecommunications is preconfigured by at least one of an application server and user equipment (UE) based on, for example, service type (e.g., voice and/or data). When the bitrate for transfer is required to be changed, reconfiguration of the initially set MBR at the packet gateway is necessary. This approach is cumbersome, and may result in packet loss, muting, and degraded user experiences. Additionally extraneous time, human, and computational resources may be required to reconfigure the initially preconfigured MBR.

In other words, in the related art, there exists a problem that, since data transmission is capped at a preconfigured MBR, if data over the MBR is transferred, packets will be dropped. This may result in muting, one-way communication (e.g., one-way calls), etc. Conventionally such a problem has arisen because, although data transfer is capped at the gateway by the preconfigured MBR, applications can still transmit data at a higher rate.

Embodiments of the disclosure provide solutions to the above problems. Specifically, embodiments of the disclosure are directed toward dynamic setting and adaption of the MBR based on the codec of the telecommunication service/application. The dynamic adaption of the MBR according to embodiments proactively prevents packet loss and muting (e.g., of a user's own network), which thereby improves a user's experience. Further, the dynamic adaption results in less downtime and the reduction of waste of human and computational resources by way of fewer bitrate adjustments. Further, embodiments of the disclosure may also enhance a user's experience through better connectivity and better response rate and time, and reduce interoperability issues.

FIG. 1 is a flow chart of an example process 100 according to an embodiment. Referring to FIG. 1, at operation 101, a UE sends/receives an originating or terminating call trigger to/from another UE in response to an initiated/terminated VoLTE (voice over long term evolution)/RCS (Rich Communication Service) call (e.g., over-the-top (OTT calls)).

At operation 102, a dedicated bearer channel for Internet telecommunication/data transmission is established. This establishment of the dedicated bearer channel is described in further detail below with reference to FIGS. 2,3, and 12.

Figure 12:
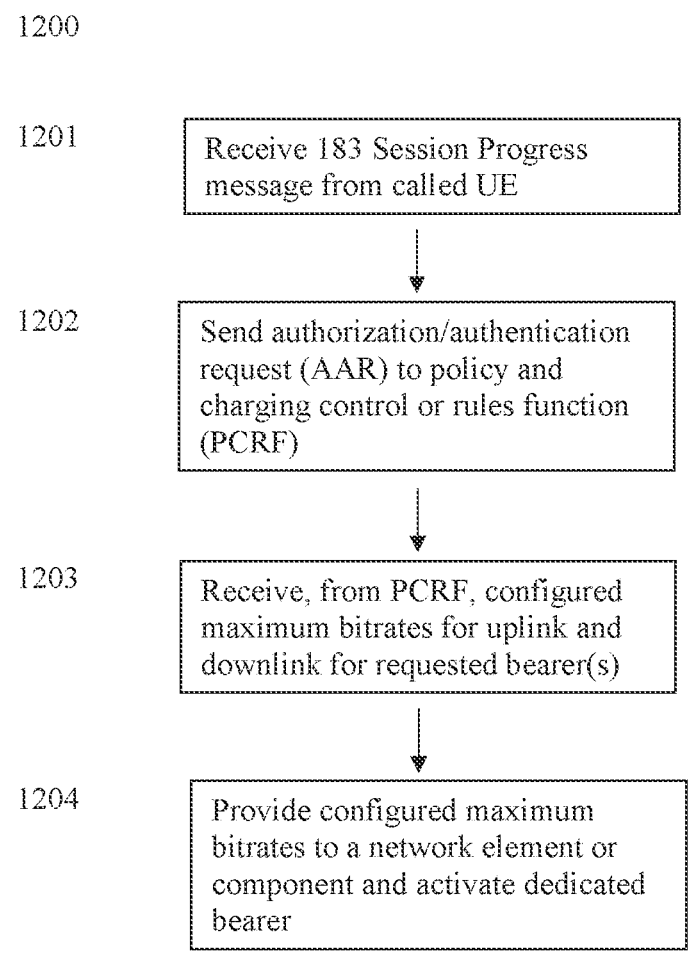
FIG. 12 is a flow chart of a method of establishing a dedicated bearer channel according to an embodiment.

FIG. 12 is a flow chart of a method of establishing a dedicated bearer channel according to an embodiment.

Referring to FIG. 12, an application server receives a 183 Session Progress message from the called UE at operation 1201. For example, the application server may be an IMS for VoLTE or WebRTC Gateway (WRG) (RCS). At operation 1202, the application server sends an authorization/authentication request (AAR) to a policy and charging control or rules function (PCRF), upon reception of 183 Session Progress from the called UE. At operation 1203, the application server receives, from the PCRF, configured maximum bitrates for the uplink and downlink for the requested bearer(s), per the service type (e.g., Video call/VoLTE call). This operation is described in further detail with reference to FIGS. 3A and 3B below.

At operation 1204, the application server provides the configured maximum bitrates to a network element or component and the dedicated bearer is activated. The dedicated bearer is activated (e.g., bearer modification is initiated by Evolved Packet Core (EPC) elements, the packet gateway (PGW) and/or the server gateway (SGW)) based on the configured maximum bitrates provided by the application server. Thus, in operation 102, bitrates of the bearer channel are modified and/or set to satisfy or correspond to the maximum allowed bitrates.

This is further illustrated in FIGS. 5A and 5B, which depict capping of maximum bitrates of upload and download for an IP-CAN session. In the example of FIGS. 5A-5B, the MBR is capped at 30 kbps by a modify bearer request for Quality of Service (QoS) class identifier (QCI) 1.

Next, in operation 103, for each call, it is determined whether (or confirmed that) the bitrate transmitted is compliant with the maximum bitrate configured by the application server during the bearer establishment for both the originating and terminating ends of the call session (VoLTE/RCS). Specifically, the bitrate at which the application transmits data packets in uplink towards the called party is determined based on the bitrate of the negotiated codec during the call along with the IP overheads. According to embodiments, operation 103 may be performed by a network element such as the PGW, which may have access to both the actual application bitrate and preconfigured MBR set by the application server. Alternatively, or in addition, operation 103 may be performed by an external monitoring entity that monitors both the PCRF and the Application Function (AF) of all application(s) (e.g. VoLTE/RCS).

An example of the bitrate determination or calculation is illustrated in FIG. 4. The example of FIG. 4 depicts a calculation process of a bitrate for an RCS session with an audio codec bitrate of 12.65 Kbps (IPv4/v6). Specifically, FIG. 4 shows bitrate information for a communication application using an Adaptive Multi-Rate Wideband (AMR-WB) codec with IPv4 or IPv6 header types. However, this application/process is not limited to this an Adaptive Multi-Rate (AMR) bitrate but may apply for all codec classes and corresponding bitrates.

As illustrated, the total bitrate at which the application transmits data packets is calculated as a sum of the codec bitrate, the transmission or IP overhead, Real-time Transport Control (RTCP) overhead, and overhead for stun pings.

At operation 104, the maximum bitrate is updated at the application server (IMS(VoLTE)/WRG(RCS)) if it is determined in operation 103 that the transmitted bitrate by the UE (mobile originated (MO) or mobile terminated (MT)) is higher than the configured MBR for the IP-CAN session. For example, the maximum bitrate may be updated by the application server upon receiving, from the network element (e.g., PGW) or external device, an instruction to update the maximum bitrate or a message indicating that the transmitted bitrate is higher than the configured MBR. Here, the updated maximum bitrate (MBR_NEW) is determined to be greater than or equal to the total application bitrate (e.g., as calculated in FIG. 4). For example, FIG. 10 depicts a message content of an AAR and/or AAA for a configuration of an initial maximum bitrate (e.g., initially requested maximum bandwidth) for an application or application type (e.g., Voice, Video, etc.), and FIG. 11 depicts a message content of an AAR and/or AAA for a configuration of an updated maximum bitrate (MBR_NEW).

Next, at operation 105, bearer modification is performed in accordance with the updated maximum bitrate. According to an example embodiment, the application server (IMS (VoLTE)/WRG(RCS)) sends (e.g., on Diameter) an authorization/authentication request (AAR) to update the policy and charging control (PCC) rules or Policy and Charging Rules Function (PCRF), upon reception of a trigger (e.g., message indicating that the transmitted bitrate is higher than configured MBR, or an instruction to set MBR_NEW). The authorization/authentication request in turn triggers an update bearer request, e.g., to a packet gateway or Packet Data Network (PDN) Gateway (PGW). This is further described with reference to FIG. 8, which depicts an example embodiment of an application function (WRG/IMS) initiated session modification.

Here, the bearer modification is triggered by the updated maximum bitrate (MBR_NEW) and the IP connectivity access network session is aligned to the new bitrates. This is further illustrated in FIG. 9, which depicts an example embodiment of a call flow for bearer modification (e.g., for updating the MBR to MBR_NEW).

A comparative example is illustrated in FIGS. 6A-6D, and 7A-7C. In FIGS. 6A-D, packet drops at the packet gateway are caused by the 30 kbps bitrate limited by the charging rule from the PCRF. Since the MBR (30 kbps) is less than the total bitrate for the transmitting application, packets are dropped at the packet gateway. Conversely, in FIGS. 7A-C, it can be seen that there are not packet drops at the packet gateway, as the MBR is updated or set to an MBR_NEW of 82 kbps (which is greater than the total bitrate for the transmitting application).

As stated above, FIG. 2 is a diagram illustrating the establishment/creation of a dedicated bearer(s) for Internet telecommunication, e.g., OTT voice/video conversation, according to an example embodiment. Here, two channels may be established from the sever gateway (UE/client) (201): one bearer channel for Internet communication (202) and one bearer channel for IMS communications (203). The bearer channel (202) for Internet communication includes at least sub-channels (202)(i)-(iii) for the default bearer (QCI9), the dedicated bearer for voice media (RTP) (QCI1), and the dedicated bearer for video media (QCI2), respectively. Likewise, the bearer channel for IMS communications (203) includes at least sub-channels (203)(i)-(ii) for the default bearer for voice signaling (QCIS) and the dedicated bearer for voice media (RTP) (QCI1). The bearer channel (202) and the bearer channel (203) connect via the packet gateway (PGW) (204) and communicate by at least a policy and charging rules function (205) to the network backbone (206), a vendor A RCS core (207) and a vendor B IMS core (208).

Figure 3A:
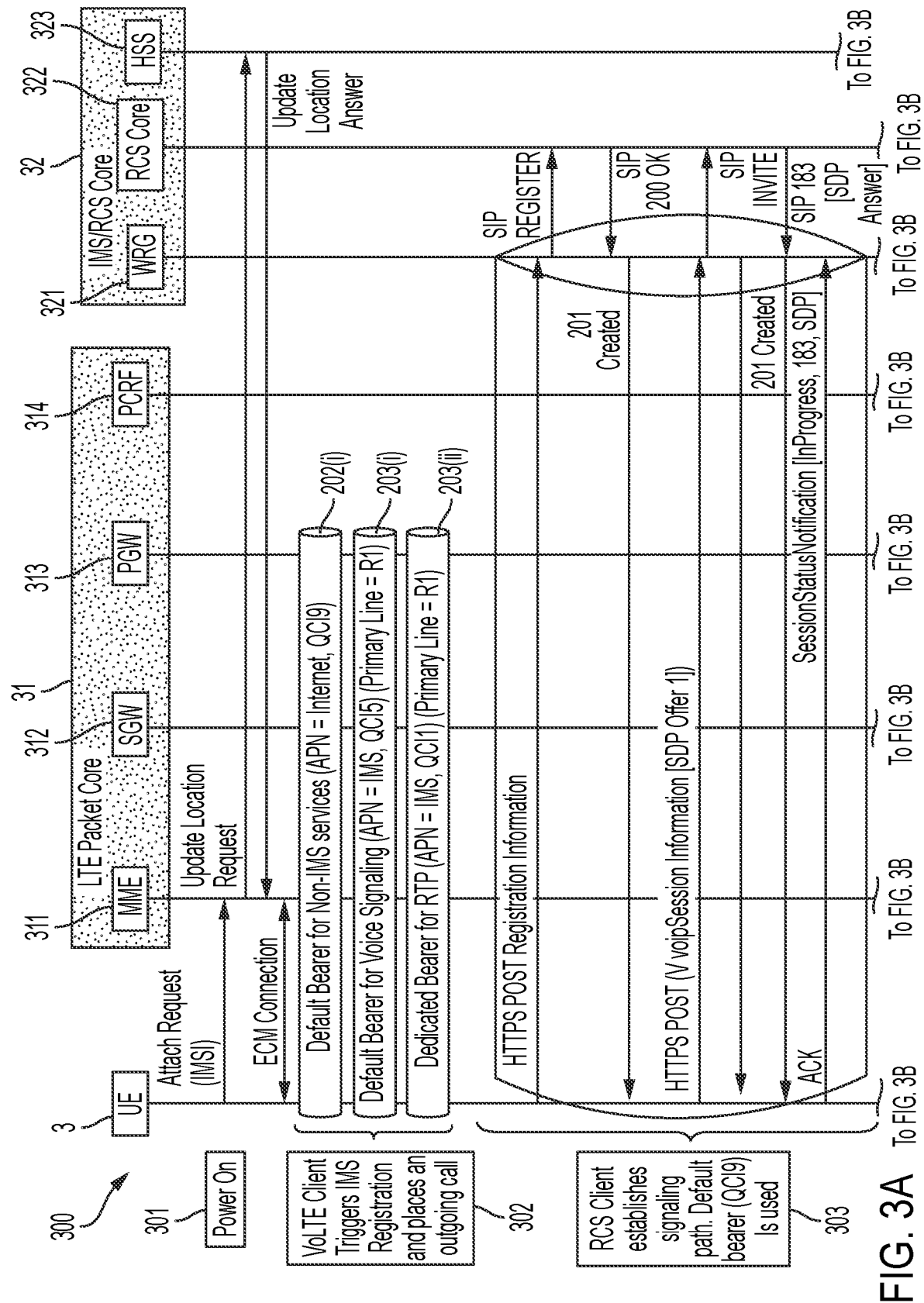
FIG. 3A is a diagram illustrating an overall flow diagram of Internet telecommunications according to an embodiment.
Figure 3B:
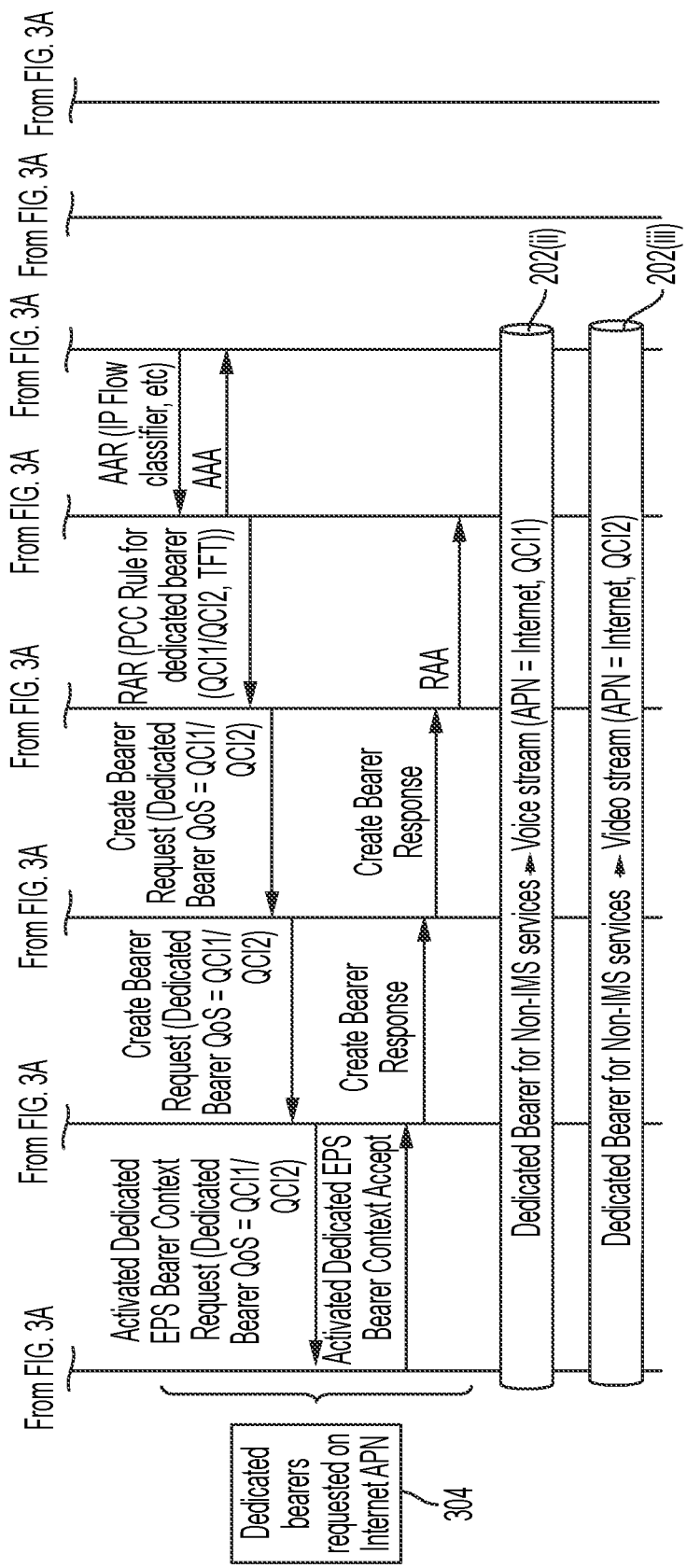
FIG. 3B is a diagram illustrating an overall flow diagram of Internet telecommunications according to an embodiment.
Figure 7B:
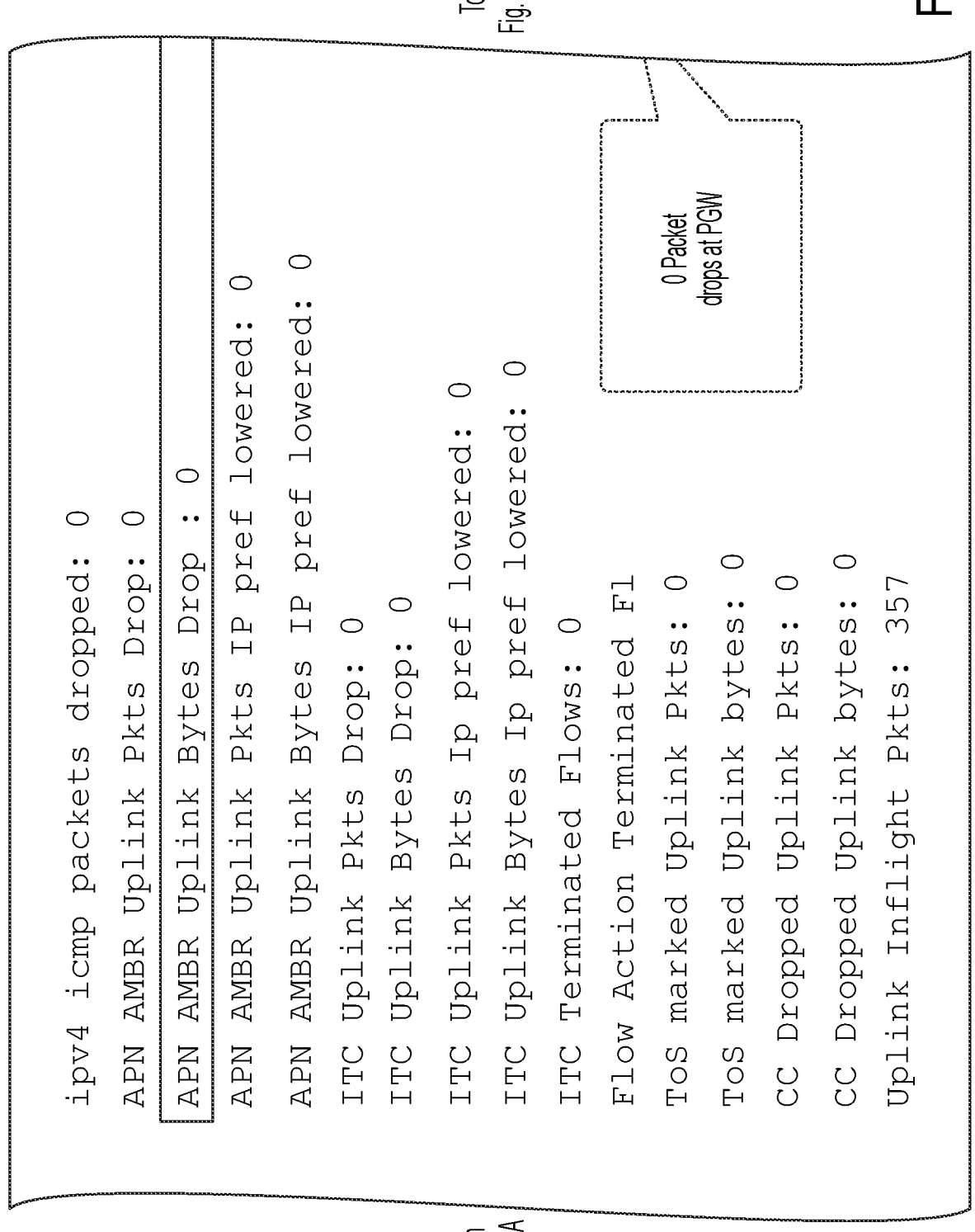
FIG. 7B depicts packet gateway throughput where a maximum bitrate is updated or set to be greater than a total bitrate calculated for a transmitting application, according to an embodiment.

Relatedly, FIGS. 3A and 3B together provide a diagram illustrating an overall flow diagram (300) of Internet telecommunications according to an example embodiment, and architecture therefore. FIGS. 3A and 3B together illustrate a voice/video call flow for VoLTE and RCS, though it should be understand that embodiments are not limited thereto and may be applied to any network communication in which a maximum bitrate is configurable.

Referring to FIGS. 3A and 3B, at operation 301, the UE (3) is powered on, and thereafter sends an attach request (IMSI) to the LTE Packet Core (31), which includes a Mobility Management Entity (MME) (311), a Serving Gateway (SGW) (312), a PGW (313) (which may be the same PGW as (204) in FIG. 2), and a PCRF (314). After the LTE Packet Core (31) receives the attach request (IMSI), which is usually sent to the MME (311), the LTE Packet Core (31), and more specifically according to embodiments, the MME (311) sends an update location request to the IMS/RCS Core (32). The IMS/RCS Core (32) includes WRG (321), RCS Core (322), and a Home Subscriber Server (HSS) (323), and the update location request may be received by the WRG (321). Next the IMS/RCS Core (32), by way of the HSS (323), sends an update location answer to the LTE Packet Core (31), e.g., the MME (311). The LTE Packet Core (31) then communicates via an EPS Connection Management (ECM) Connection (for example, through the MME (311)) to the UE (3).

Next, at operation 302, a VoLTE Client Triggers IMS Registration and places an outgoing call on the UE (3). More specifically, at least three default bearer channels/sub-channels are established: the default bearer channel (202i) for Internet communication (QCI9), the default bearer channel (203i) for voice signaling (QCI5), and the dedicated bearer channel (203ii) for voice media (RTP) (QCI1).

At operation 303, the RCE client establishes a signaling path. According to an embodiment, the bearer channel (202i) for Internet communication is used. In this operation, HTTPS POST registration information is sent from the UE (3) to the IMS/RCS Core (32), and more specifically to the WRG (321). The WRG (321) then sends SIP registration to the RCS Core (322), which responds by sending SIP 200 OK back to the WRG (321). The WRG (321) then responds to the UE (3) with 201 created. The UE (3) then sends HTTPS POST (V voipSession Information [SDP Offer 1]) to the WRG (321), which in turn sends a SIP invite to the RCS Core (322). The RCS Core (322) responds to the WRG (321) with SIP 183 [SDP Answer]. Then, the WRG (321) responds back to the UE (3) with SessionStatusNotification [In-Progress, 183, SDP]. The UE (3), in turn, sends an acknowledgment (ACK) to the WRG At operation 304, the dedicated bearers are requested for Internet communications. Specifically, the WRG (321) sends an AAR (IP Flow classifier, etc.) to the PCRF (314), which in turn responds with the Authentication/Authorization Answer (AAA). The sending of the AAR provides at least configured maximum bitrates (MBRs) for uplink and downlink for the relevant requested bearer(s) and per service type (e.g., Video call/VoLTE call).

The PCRF (314) also sends RAR (PCC Rule for dedicated bearer (QCI1/QCI2, TFT)) to the PGW (313). Then, the PGW (313) creates a bearer request (Dedicated Bearer QoS=QCI1/QCI2) and sends that to the SGW (312). The SGW (312) then sends the create bearer request (Dedicated Bearer QoS=QCI1/QCI2) to the MME (311). The MME (311) then sends an instruction of activate dedicated EPS Bearer context request (dedicated beater QoS=QCI1/QCI2) to the UE (3). Then, the UE (3) sends an activate dedicated EPS Bearer Context accept request to the MME (311). The MME (311) sends a create bearer response to the SGW (312), which in turns sends the create bearer request to the PGW (313). The PGW (313) then sends a Re-Authorization Answer (RAA) to the PCRF (314).

According to embodiments, and following the above operations, a dedicated bearer for voice media (RTP) (QCI1) (dedicated bearer for non-IMS services ->voice stream (APN=Internet, QCI1)) is established. This bearer channel may be equivalent to the channel (202ii) described above with reference to FIG. 2. It is understood that this channel may differ according to embodiments. Also, a dedicated bearer channel for video media (QCI2) (non-IMS services ->video stream (APN=Internet, QCI2)) is also established. This bearer channel may be equivalent to the channel (202iii) described above with reference to FIG. 2. It is understood that this channel may differ according to embodiments.

Figure 8:
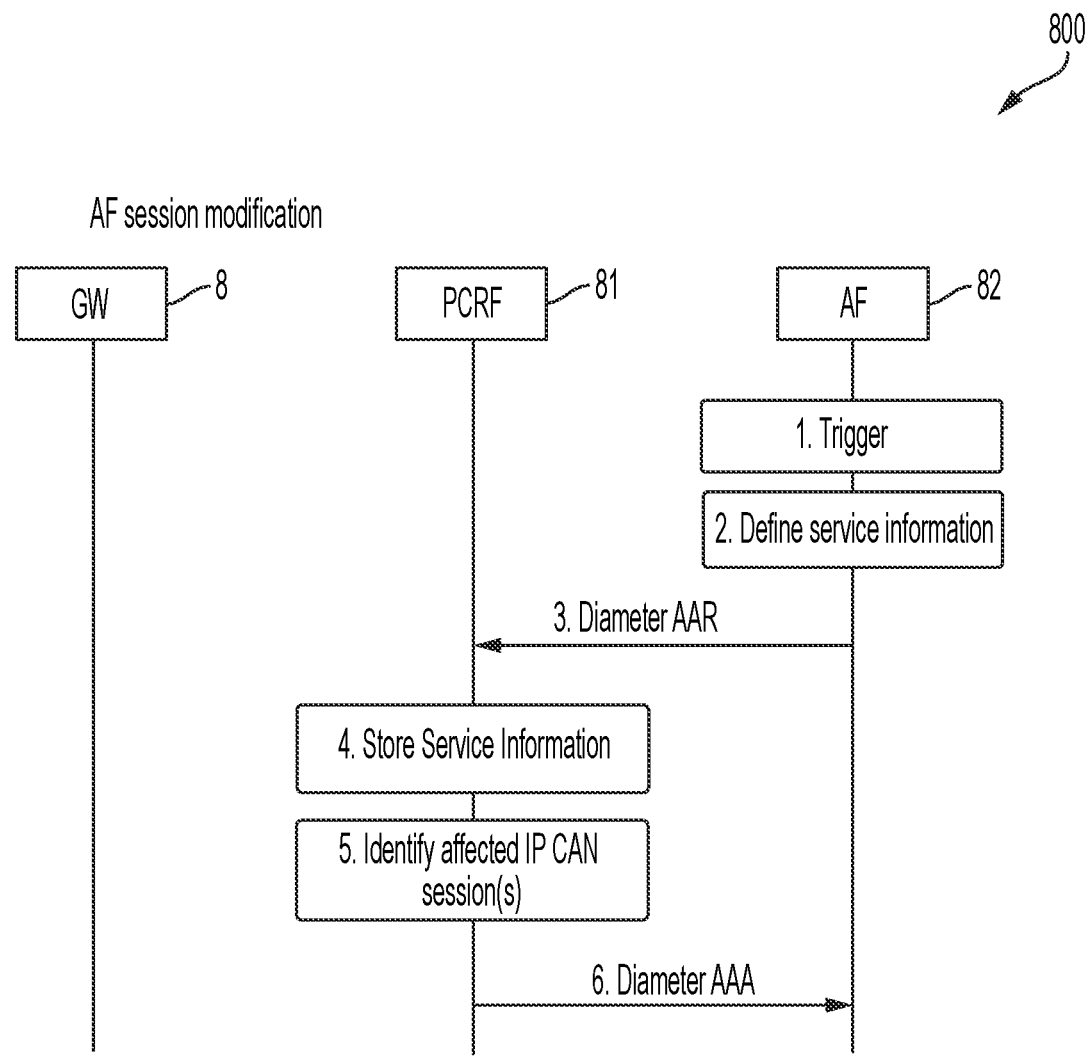
FIG. 8 is a diagram of an Application Function (AF) (WRG/IMS) Initiated Session Modification according to an embodiment.

FIG. 8 is a diagram of an Application Function (AF) (WRG/IMS) Initiated Session Modification flow (800) according to an embodiment. Depicted in FIG. 8 are operations of a gateway (GW) (8), a PCRF (81), which may be equivalent to the PCRF (314) described above, and an AF (82).

According to embodiments, following a trigger and implementation of defined service information, the AF (82) sends a diameter AAR to the PCRF (81). Next, the PCRF (81) stores the aforementioned service information and identifies affected IP-CAN session(s). Then, the PCRF (81) sends diameter AAA to the AF (82).

Figure 9:
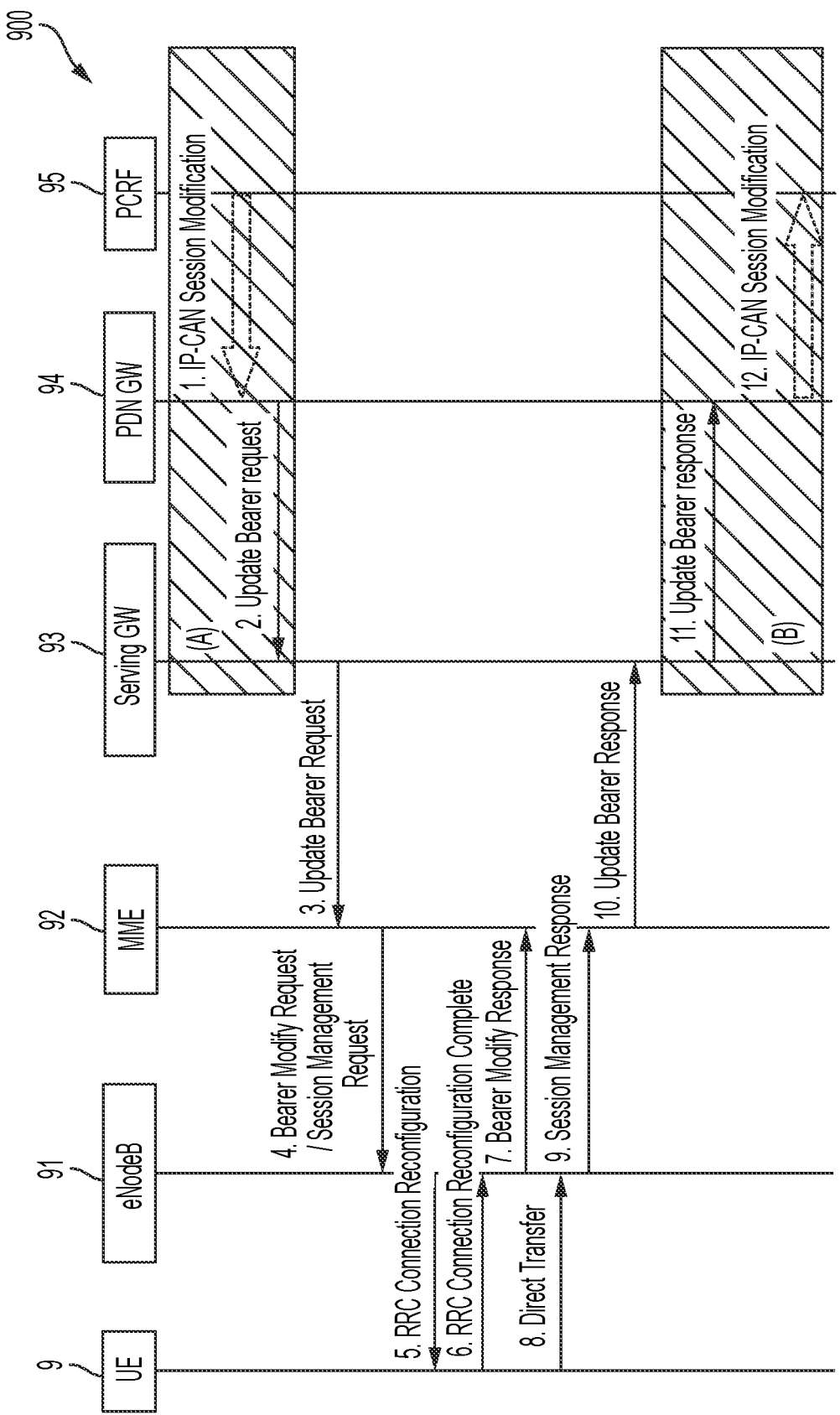
FIG. 9 is a call flow for Bearer Modification according to an embodiment.

FIG. 9 is a call flow (900) diagram for bearer modification (e.g., for updating MBR by MBR_New) according to an embodiment. Depicted in FIG. 9 are operations of a UE (9), which may or not be the same UE (3) as described above, an eNodeB (91), an MME (92), which may or may not be the same MME (311) as described above, a SGW (93), which may or may not be the same SGW (312) as described above, a PGW (94), which may or may not be the same PGW (313) or PGW (204) as described above, and a PCRF (95), which may or may not be the same PCRF (314) as described above.

According to embodiments, the PCRF (95) sends an IP-CAN session modification to the PGW (94). The PGW (94) sends an update bearer request to the SGW (93), and the SGW (93) sends an update bearer request to the MME (92). Next, the MME (92) sends a bearer modify request/session management request to the eNodeB (91), and the eNodeB (91) sends an RRC Connection reconfiguration the UE (9). The UE (9) then sends an RRC connection reconfiguration complete indication to the eNodeB (91), which sends a bearer modify request to the MME (92). Next, the UE (9) sends a direct transfer to the eNodeB(91), which in turn sends a session management response to the MME (92). The MME (92) then sends an update bearer response to the SGW (93), and the SGW (93) sends an update bearer response to the PGW (94). Finally, the PGW (94) sends an IP-CAN session modification to the PCRF (95).

As explained above, according to embodiments, the calculation of the total application bitrate and/or the updating of the MBR based on the total application bitrate may occur after the establishment of the dedicated bearer channel.

According to embodiments, the afore-described system, method, and computer program may be implemented by at least one of the following: incorporation at the PGW, which has access to both actual application bit rate as well as configured MBR by the application server, and through incorporation in an external monitoring entity that can check/determine both the PCRF and AF of all application(s)_ -VoLTE/RCS.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of dynamically adapting an allowable maximum bitrate (MBR) configuration of an IP Multimedia Subsystem (IMS)/Rich Communication Services (RCS) application, the method comprising:
receiving a signal from a client server having initiated an Internet multimedia communication through the IMS/RCS application,
establishing at least one bearer channel for the Internet multimedia communication, the at least one bearer channel having an initial preconfigured allowable MBR,
determining a codec used to transmit the Internet multimedia communication through the IMS/RCS application,
determining the bitrate used by the codec,
determining whether a portion of the transmission of the Internet multimedia communication exceeds the initial preconfigured allowable MBR,
modifying the allowable MBR of the at least one bearer channel based on the bitrate of the codec to increase the allowable MBR of the at least one bearer channel based on a determination that a portion of the transmission of the Internet multimedia communication exceeds the initial preconfigured allowable MBR, and following the increase, determining and verifying whether packets losses are occurring with the increased allowable MBR.

2. The method of claim 1, wherein the initial preconfigured allowable MBR of the at least one bearer channel is set by a policy control and charging function (PCRF), which in turn is set by the IMS/RCS application.

3. The method of claim 1, further comprising, after the at least one bearer channel is established, configuring the at least one bearer channel to transmit at the initial preconfigured allowable MBR.

4. The method of claim 1, further comprising determining packet drop.

5. A platform for dynamically adapting a maximum allowable bitrate (MBR) configuration of a computer-implemented IP multimedia subsystem (IMS)/ Rich Communication Services (RCS) application, the platform comprising:
a memory configured to store instructions; and
one or more processors configured to execute the instructions to:
receive a signal from a client server having initiated an Internet multimedia communication through the IMS/RCS application,
establish at least one bearer channel for the Internet multimedia communication, the at least one bearer channel having an initial preconfigured allowable MBR,
determine a codec used to transmit the Internet multimedia communication through the IMS/RCS application,
determine the bitrate used by the codec,
determine whether a portion of the transmission of the Internet multimedia communication exceeds the initial preconfigured allowable MBR, and
modify the allowable MBR of the at least one bearer channel based on the bitrate of the codec to increase the allowable MBR of the at least one bearer channel based on a determination that a portion of the transmission of the Internet multimedia communication exceeds the initial preconfigured allowable MBR, and following the increase, determining and verifying whether packets losses are occurring with the increased allowable MBR.

6. The platform of claim 5, wherein the intial preconfigured allowable MBR of the at least one bearer channel is set by a policy control and charging function (PCRF), which in turn is set by the IMS/RCS application.

7. The platform of claim 5, wherein the one or more processors is further configured to execute the instructions to configure the at least one bearer channel to transmit at the initial preconfigured allowable MBR.

8. The platform of claim 5, wherein the one or more processors is further configured to determine packet drop.

9. A non-transitory computer-readable medium storing instruction, the instructions comprising: one or more instructions that, when executed by one or more processors of a deployment platform for managing at least one network element, cause the one or more processors to:
- receive a signal from a client server having initiated an Internet multimedia communication through the IMS/RCS application,
- establish at least one bearer channel for the Internet multimedia communication, the at least one bearer channel having an initial preconfigured allowable maximum bitrate (MBR),
- determine a codec used to transmit the Internet multimedia communication through the IMS/RCS application,
- determine the bitrate used by the codec,
- determine whether a portion of the transmission of the Internet multimedia communication exceeds the initial preconfigured allowable MBR, and
- modify the allowable MBR of the at least one bearer channel based on the bitrate of the codec to increase the allowable MBR of the at least one bearer channel based on a determination that a portion of the transmission of the Internet multimedia communication exceeds the initial preconfigured allowable MBR, and following the increase, determining and verifying whether packets losses are occurring with the increased allowable MBR.

10. The non-transitory computer-readable medium of claim 9, wherein the initial preconfigured allowable MBR of the at least one bearer channel is set by a policy control and charging function (PCRF), which in turn is set by the IMS?RCS application.

11. The non-transitory computer-readable medium of claim 9, wherein the one or more instructions further cause the one or more processors to configure the at least one bearer channel to transmit at the initial preconfigured allowable MBR.

* * * * *